(12) United States Patent
Vanhercke et al.

(10) Patent No.: US 8,311,709 B2
(45) Date of Patent: Nov. 13, 2012

(54) IMPLEMENT INITIATED CONTROL OF TRACTOR POWER TAKE-OFF (PTO)

(75) Inventors: Olivier Vanhercke, Nieuwpoort (BE); Kevin M. Smith, Narvon, PA (US); Chris Foster, Denver, PA (US); Riccardo Morselli, Modena (IT)

(73) Assignee: CNH America LLC, New Holland, PA (US)

( * ) Notice: Subject to any disclaimer, the term of this patent is extended or adjusted under 35 U.S.C. 154(b) by 483 days.

(21) Appl. No.: 12/555,008

(22) Filed: Sep. 8, 2009

(65) Prior Publication Data

US 2011/0060507 A1 Mar. 10, 2011

(51) Int. Cl.
*G06F 19/00* (2006.01)
(52) U.S. Cl. ......... 701/50; 56/341; 53/167; 180/53.6; 180/53.7
(58) Field of Classification Search ........... 701/50; 56/341; 53/167; 192/135; 180/53.6, 53.7; G06F 19/00
See application file for complete search history.

(56) References Cited

U.S. PATENT DOCUMENTS

| | | | |
|---|---|---|---|
| 4,296,596 A | 10/1981 | Waldrop | |
| 4,306,403 A | 12/1981 | Hubbard et al. | |
| 4,344,499 A | 8/1982 | van der Lely et al. | |
| 4,674,403 A * | 6/1987 | Bryant et al. | 100/4 |
| 4,715,012 A | 12/1987 | Mueller, Jr. | |
| 4,765,238 A * | 8/1988 | De Busscher et al. | 100/89 |
| 4,899,651 A * | 2/1990 | Lausch et al. | 100/87 |
| 5,136,831 A * | 8/1992 | Fell et al. | 56/341 |
| 5,557,510 A | 9/1996 | McIntyre et al. | |
| 5,740,044 A | 4/1998 | Ehrenhardt et al. | |
| 5,839,362 A * | 11/1998 | Ratzlaff et al. | 100/88 |
| 6,012,271 A | 1/2000 | Wilkens et al. | |
| 6,101,932 A | 8/2000 | Wilkens | |
| 6,129,187 A | 10/2000 | Bellanger et al. | |
| 6,173,225 B1 | 1/2001 | Stelzle et al. | |
| 6,430,904 B1 | 8/2002 | Coers et al. | |
| 6,546,705 B2 | 4/2003 | Scarlett et al. | |
| 6,758,292 B2 | 7/2004 | Shoemaker | |
| 6,843,044 B2 | 1/2005 | Clauss | |
| 6,942,595 B2 | 9/2005 | Hrazdera | |

(Continued)

FOREIGN PATENT DOCUMENTS

DE 19725699 A1 * 12/1998

(Continued)

OTHER PUBLICATIONS

Lei Feng, Yong He, Qin Zhang, "Tractor-implement dynamic trajectory model for automated navigation applications", vol. 1, Publication Year: 2005, pp. 330-335 vol. 1.*

(Continued)

*Primary Examiner* — Tuan C. To
(74) *Attorney, Agent, or Firm* — Patrick M. Sheldrake

(57) ABSTRACT

A control system for managing the operation of a tractor PTO using input conditions occurring in a connected baler. Baler conditions such as tailgate position, crop pickup position, bale wrapper status, and driveline torque are sensed in the baler, and communicated to an implement-mounted controller whereupon control signals are initiated and communicated to a tractor-mounted controller to manage operation of the tractor's PTO. Safety may be maintained through the use of operator acknowledgements in order to prevent unexpected engagement of the PTO and a manual override capability allows an operator to suspend automated operation at any time.

20 Claims, 2 Drawing Sheets

U.S. PATENT DOCUMENTS

| | | |
|---|---|---|
| 7,048,106 B2 | 5/2006 | Hou |
| 7,399,255 B1 | 7/2008 | Johnson et al. |
| 7,404,355 B2 | 7/2008 | Viaud et al. |
| 7,416,068 B2 | 8/2008 | Ray et al. |
| 7,464,526 B2 | 12/2008 | Coenen |
| 7,640,721 B2 * | 1/2010 | Viaud et al. ............... 56/341 |
| 2002/0108508 A1 * | 8/2002 | Leupe et al. ............... 100/45 |
| 2002/0174781 A1 * | 11/2002 | Leupe et al. ............... 100/88 |
| 2003/0006075 A1 * | 1/2003 | Arnold ............... 180/53.6 |
| 2005/0004726 A1 | 1/2005 | Paquet |
| 2006/0191359 A1 | 8/2006 | Tarasinski et al. |
| 2006/0241838 A1 | 10/2006 | Mongiardo et al. |
| 2007/0175198 A1 | 8/2007 | Viaud |
| 2009/0113865 A1 * | 5/2009 | Lohrentz ............... 56/10.1 |
| 2009/0143941 A1 * | 6/2009 | Tarasinski et al. ............... 701/41 |
| 2009/0223197 A1 * | 9/2009 | Kohlbeck ............... 56/341 |
| 2009/0255775 A1 | 10/2009 | Viaud |
| 2010/0036569 A1 * | 2/2010 | Hel et al. ............... 701/50 |
| 2010/0040436 A1 * | 2/2010 | Bruha et al. ............... 414/24.5 |
| 2010/0115911 A1 * | 5/2010 | Smith ............... 56/341 |
| 2010/0193617 A1 * | 8/2010 | Marschall et al. ............... 241/47 |
| 2010/0326294 A1 * | 12/2010 | Smith et al. ............... 100/88 |

FOREIGN PATENT DOCUMENTS

EP    150628 A1 *    8/1985

OTHER PUBLICATIONS

Matsushita, K., Murakami, T, "Nonholonomic Equivalent Disturbance Based Backward Motion Control of Tractor-Trailer With Virtual Steering", vol. 55 , Issue: 1, Publication Year: 2008 , pp. 280-287.*

* cited by examiner

IMPLEMENT INITIATED CONTROL OF TRACTOR POWER TAKE-OFF (PTO)

BACKGROUND OF THE INVENTION

The present invention relates generally to agricultural round balers attached to agricultural tractors or other primary sources or motive power, and more particularly to baler systems and methods for automating the operation of the tractor power take-off (PTO).

Demand for operational efficiency continues to increase in crop packaging, especially in round balers. Efficiency gains in equipment operation and/or improvements in equipment operating lifespan all serve to improve the economics surrounding crop packaging. It is desirable in round baler operation to disengage some or all of the driven components during discrete portions of the total baling cycle. For example, disengaging the drive belts during the bale ejection process reduces damage to the bale surface, reduces wear on the belts, and prevents belt mis-tracking while the tailgate is open. Some balers incorporate de-clutching mechanism for discrete components within the baler. Others may rely on the operator disengaging the tractor PTO while the tailgate is being opened and closed for bale ejection.

Similarly, many PTO-driven machines may require adjustments to vehicle travel speed based on the conditions encountered by the machine. For example, the amount of incoming crop material may overwhelm the capacity of a round baler if the baler is pulled too quickly through a windrow. It is desirable for an operator to be informed of the torque being provided to the implement in order to better manage implement travel speed.

Electronic control systems are being deployed on agricultural equipment with increasing frequency as a means to improve operational efficiency. Many tractors incorporate a data bus which allows various controllers on the tractor to share information on a data network and coordinate control actions. With this in mind, it would be advantageous to provide a method to engage and disengage the tractor power take-off in response to initiating events in a round baler, such as the opening and closing of the tailgate. Further advantages would be realized if additional baler operating conditions could also initiate changes in PTO operation to further minimize the manual actions required to be performed by an operator. Still further advantages would be realized if the improved control system provided sufficient operator notification to reduce inadvertent control actions and thereby improve operating safety. These and other advantages are provided by the draft control system described below.

SUMMARY OF THE INVENTION

Accordingly, the present invention, in any of the embodiments described herein, may provide one or more of the following advantages:

It is an object of the present invention to provide a control system that coordinates operation of a power take-off on a tractor with operation of a connected agricultural baler.

It is a further object of the present invention to provide a control system for a tractor that connects discrete controllers on the tractor and a connected implement so that actions managed by the implement-mounted controller may be coordinated with and used to initiate actions in the tractor-mounted controller.

It is a further object of the present invention to provide a control system for the power take-off on an agricultural vehicle that is responsive to signals initiated in a controller disposed on a connected implement, such as a baler.

It is a further object of the present invention to provide a control system that senses the change in position of the tailgate on a round baler and initiates an appropriate change in the operating status of the PTO powering the baler.

It is a further object of the present invention to provide a control system for the PTO of a tractor powering a connected round baler that manages operation of the PTO based on the position of the baler crop pick-up.

It is a further object of the present invention to provide a control system for a tractor PTO powering a connected baler that receives a torque input threshold from a baler-mounted controller and subsequently manages PTO torque within the torque input threshold. The control system may receive a running torque value from a sensor located on the tractor or the baler.

It is a still further object of the present invention to provide a control system for the PTO of a tractor powering a connected round baler that manages operation of the PTO based on the operational status of the baler wrapper.

It is a still further object of the present invention to provide an automated control system for a tractor PTO that responds to inputs from an implement-mounted controller and provides operator acknowledgement interlocks to prevent unanticipated actuation of the PTO.

It is a still further object of the present invention to provide a control system for a tractor PTO receiving inputs from an implement-mounted control system that is durable in construction, inexpensive of manufacture, carefree of maintenance, easily assembled, and simple and effective to use.

These and other objects are achieved by providing a control system for managing the operation of a tractor PTO using input conditions occurring in a connected baler. Baler conditions such as tailgate position, crop pickup position, bale wrapper status, and driveline torque are sensed in the baler, and communicated to an implement-mounted controller whereupon control signals are initiated and communicated to a tractor-mounted controller to manage operation of the tractor's PTO. Safety may be maintained through the use of operator acknowledgements in order to prevent unexpected engagement of the PTO and a manual override capability allows an operator to suspend automated operation at any time.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
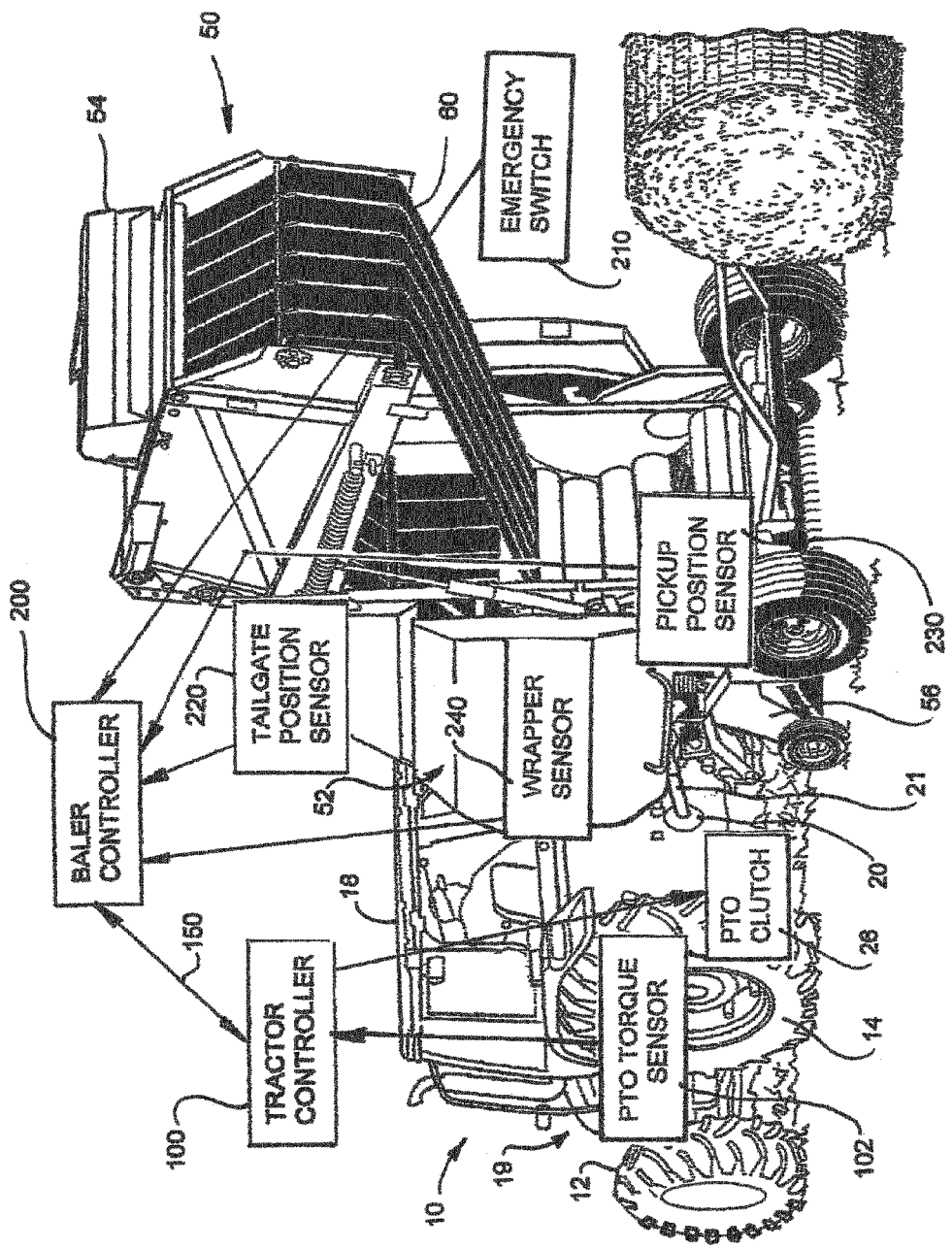
FIG. 1 is an illustration of an agricultural tractor pulling a round baler of the type on which the present invention is useful.

Referring now to FIG. 1, there is illustrated an agricultural tractor 10 having a pair of front wheels 12 and a pair of rear wheels 14 supporting a chassis. An operator's cab 18 is provided on the chassis from which the tractor can be comfortably operated. An engine 19 provides motive power to move the tractor 10 and for powering connected implements. Power take-off (PTO) 20 is provided to selectively transfer motive power from engine 19 to a connected implement, such as baler 50, shown. The drive of a PTO 20 on a tractor is well-known in agricultural machinery, and may be selectively driven at one of a number of pre-determined shaft speeds, typically 540, 750, 1000 or 1400 rpm, which are usual in practice. The PTO drive shaft 21 receives input power from the engine by means of a hydraulically actuated clutch, to which pressure is admitted from the hydraulic circuit of the tractor via a solenoid valve. In many applications, a controller 100 on the tractor receives input from an operator interface whereupon the controller 100 initiates a control signal which actuates the solenoid valve and thus the PTO clutch 26 thereby changing the operational status of the PTO drive shaft 21. This arrangement enables the operator to selectively control operation of the PTO.

In round baler operation, it is desirable to disengage some or all of the driven components, most notably belts 60, during portions of the baling cycle in order to reduce the potential for damage to the outer surface of the bale and to reduce wear on certain baler components. In current practice, the operator may monitor actions of the baler and manually initiates changes (starting or stopping) to the PTO operating state based on the baler actions. With the advent of more sophisticated round balers, some are now equipped with on-board controllers to monitor baler actions as part of the overall baling process, including actuation of an implement-mounted de-clutching mechanism to momentarily suspend movement of the driven components (e.g., belts) during the bale ejection process.

Figure 2:
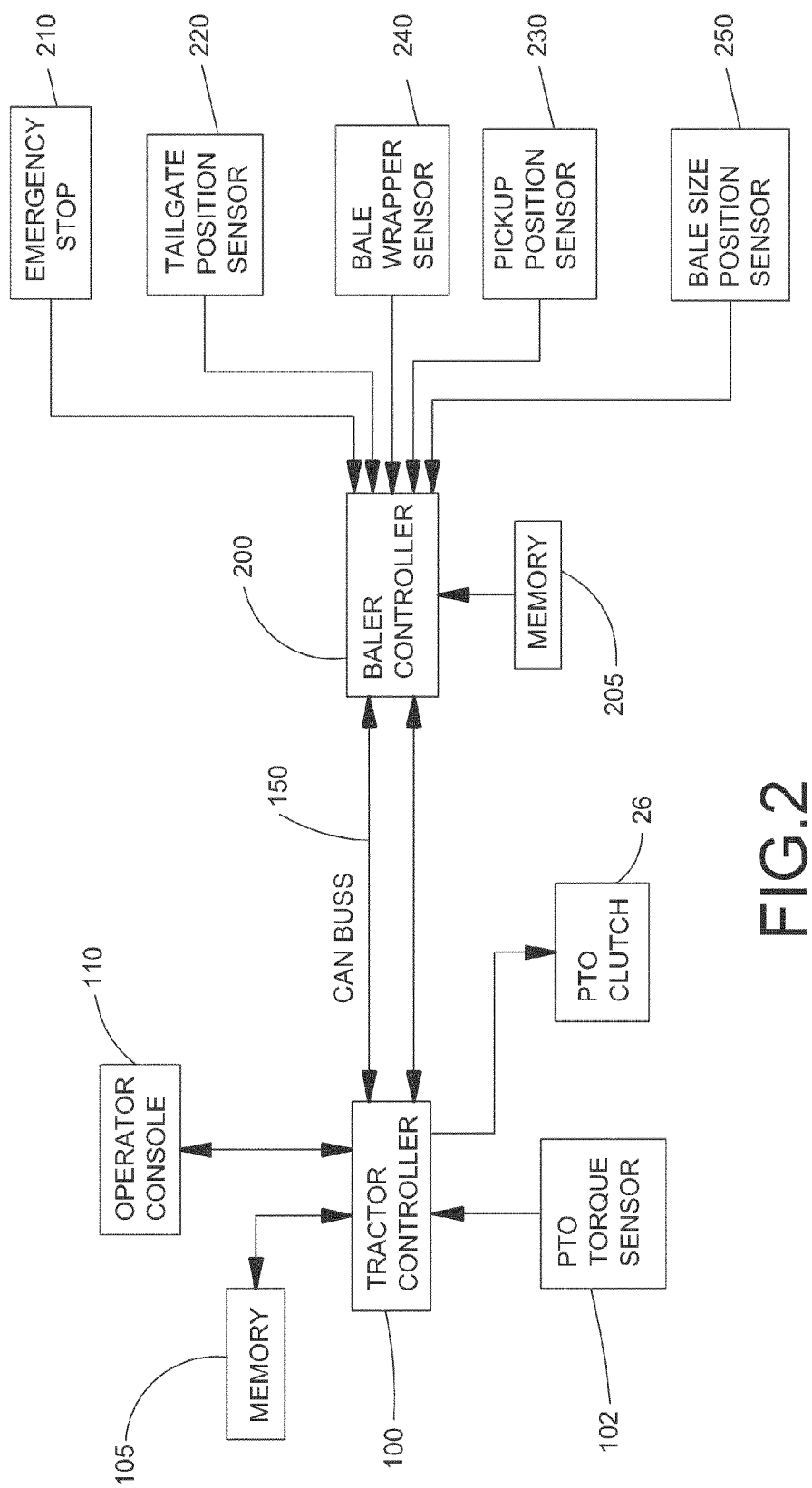
FIG. 2 is a schematic diagram of the tractor and the implement control system embodying the present invention.

Now referring to FIGS. 1 and 2, baler 50 is shown to include an implement controller 200 and several sensors for monitoring operation of the baler. Monitoring sensors include an emergency stop input 210, tailgate position sensor 220, crop pickup position sensor 230, bale wrapper position sensor 240, and a bale size monitor 250 which allow implement controller 200 to sense the position of various baler subsystems. More advanced balers may include servos or other actuator devices that may be configured to receive control action signals from implement controller 200 thus allowing the controller 200 to monitor and manage actions within the implement. Such advanced control systems are not essential to the implement of the present invention and are thus not discussed further herein, other than noting that the present invention may be implemented on an implement control system that monitors and manages key implement sub-systems.

The tractor controller 100 and the baler controller 200 are preferably digital controllers. Each of the controllers includes a digital control and communication interface which enables the controllers to communicate over a shared electronic controller area network communications bus 150. The communications bus is also referred to herein as a CAN bus.

Further information on the CAN bus systems is provided in U.S. Pat. No. 6,907,331 issued to Paquet, the descriptive portions being incorporated herein by reference. While a serial communications protocol is described, use of other protocols (e.g., parallel) are equally suitable and thus are not precluded by this invention.

In one embodiment of the invention, existing sensors on the implement which provide input to implement controller 200 are used as inputs for the PTO clutch control 26 on the tractor in a manner that will change the state of the PTO (operating or non-operating) in response to conditions in the implement. Communication between the implement controller 200 and the tractor controller 100 is enabled by a CAN bus 150 which extends from tractor to implement. When the tailgate 54 is repositioned from the closed to the open position, tailgate position sensor 220 senses the movement and directs a signal to the implement controller 200. Implement controller 200, communicating with the tractor controller 100, directs the cessation of the PTO by disengagement of the PTO clutch. When the tailgate is lowered, again sensed by tailgate position sensor 220, controller 200 will initiate a signal to tractor controller 100 to re-activate the PTO. In a similar manner, the state of the PTO operation can be altered based on the position of the crop pick-up unit 56, sensed by crop pick-up position sensor 230, operation of the bale wrapper 52, completion of the wrapping process being sensed by wrapper sensor 240 indicating that PTO operation should be suspended in preparation of the tailgate opening.

An implement protection feature can easily be incorporated by enabling the maximum torque rating of a powered implement to be input into the control system as a pre-selected value, either stored in an on-implement memory module 205 for access by the implement controller 200 or manually entered using the operator interface 110 on the tractor and stored in the tractor controller memory 105 or in the on-implement memory module 205. Operation of the implement above the maximum torque generally indicates that a problem exists within the implement, such as a crop material jam. The tractor controller 100, by monitoring the PTO torque from PTO torque sensor 102, can initiate a signal to disengage the PTO clutch 26 to suspend operation of the PTO when the torque being delivered to the implement exceeds a pre-selected value. Implement operational efficiency can be improved by providing an indication of the torque being supplied to the implement by the PTO in relation to the pre-selected torque threshold. Such an indication could then be observed by an operator and used to adjust tractor-implement ground speed to maintain operation of the implement as close to the torque threshold as possible thereby maximizing implement utilization efficiency. It is noted that such protective features may find utility on numerous PTO-driven implements, and is thus not limited to application on agricultural round balers.

In another embodiment, operator safety in a system incorporating the invention is improved by programming the tractor controller 100 to require an operator acknowledgement input (via the operator interface 110 before tractor controller 100 initiates a signal to engage the PTO drive clutch. Such an interlock prevents an inadvertent or unexpected actuation of the PTO drive. Further improvements in safety are provided by incorporating an implement-mounted emergency stop switch 210 which is capable of suspending operating of the tractor PTO when activated. The emergency stop switch 210 provides an input to the baler controller 200 which is then communicated to the tractor controller 100 where a PTO disengage signal is generated to disengage the PTO clutch.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A control system for managing the operation of a power take-off on an agricultural tractor powering a connected implement, the power take-off operable between an engaged and a disengaged state, said control system comprising:
    an actuator disposed on the tractor for shifting the power take-off between the engaged state and the disengaged state;
    a first controller disposed on the tractor and configured to initiate an actuator signal which causes said actuator to shift between said engaged and disengaged states;
    at least one movable part position sensor disposed on the implement, said at least one position sensor configured to initiate an implement position signal corresponding to changes in an implement part position between a first position and a second position;
    a second controller disposed on the implement, said second controller system configured to receive said implement position signal from said at least one position sensor and generate at least one implement output signal in response; and
    a communication bus connecting said first controller and said second controller and configured to transmit signals between said first and second controllers; and
    wherein said first controller is configured to receive said at least one implement output signal and programmed to then initiate a change in the state of the power take-off based on the implement part position.

2. The control system of claim 1, wherein said actuator is a clutch mechanism movable between engaged and disengaged positions corresponding to said engaged and disengaged states, respectively, responsive to said actuator signal.

3. The control system of claim 1, wherein the implement is a round baler having a tailgate, said tailgate being movable between open and closed positions, said at least one position sensor is configured to sense said tailgate position, and wherein said open and closed positions correspond to said first and second positions, respectively.

4. The control system of claim 1, wherein the implement is a round baler having a crop pick-up apparatus, said pickup apparatus being movable between raised and lowered positions, said at least one position sensor is configured to sense said pickup apparatus position, and wherein said raised and lowered positions correspond to said first and second positions, respectively.

5. The control system of claim 1, wherein the implement is a round baler having a bale wrapping apparatus, said wrapping apparatus being movable between a wrapping position and a standby position, said at least one position sensor is configured to sense said wrapping apparatus position, and wherein said wrapping and standby positions correspond to said first and second positions, respectively.

6. The control system of claim 1, further comprising an emergency stop switch disposed on said implement, said stop switch having outputs corresponding to a stop state and an operating state, said stop switch being connected to said second controller and configured such that when said stop state signal is received by said second controller and communicated to said first controller, said power take-off is disengaged.

7. The control system of claim 1, wherein said communication bus is a digital communication network.

8. The control system of claim 7, further comprising a memory module connected to said first controller or said second controller and a torque sensor disposed on the tractor, said memory module configured to store a pre-selected value corresponding to a torque threshold, said torque sensor generating a running torque value said first controller initiating said actuator signal to disengage said power take-off when said running torque value equals or exceeds said torque threshold.

9. The control system of claim 8, further comprising an operator interface having a display, said display configured to indicate said running torque value to a tractor operator.

10. The control system of claim 9, wherein said display is configured to indicate said running torque value in relation to said pre-selected value.

11. The control system of claim 10, wherein said communication bus transmits signals bi-directionally between said first and second controllers.

12. The control system of claim 1, wherein said movable part position sensor does not detect the position of a manually removable access cover of driven elements on the implement.

13. A method for controlling the power take-off on an agricultural tractor, the tractor having a connected round baler powered by the power take-off, the method comprising the steps of:
    providing an actuator disposed on the tractor for shifting the power take-off between an engaged state and a disengaged state;
    providing a first controller disposed on the tractor and configured to initiate an actuator signal which causes said actuator to shift between the engaged and disengaged states;
    providing at least one movable part position sensor disposed on the baler, the at least one position sensor configured to initiate an implement position signal corresponding to changes in the movable part position between a first position and a second position;
    providing a second controller disposed on the implement, the second controller system configured to receive the implement position signal from the at least one position sensor and generate at least one implement output signal in response;
    providing a communication bus connecting the first controller and the second controller and configured to transmit signals between the first and second controllers;
    operating the tractor and connected implement;
    changing the baler position from the first position to the second position;
    sensing, by the at least one position sensor, the change in baler position and initiating the implement position signal;
    receiving by the second controller of the implement position signal;
    communicating via the communication bus between the second controller and the first controller in response to the implement position signal; and
    initiating by the first controller in response to communication with the second controller of an output signal configured to change the state of the power take-off, based on the implement part position.

14. The method of claim 13, wherein the actuator is a clutch mechanism movable between engaged and disengaged positions corresponding to the engaged and disengaged states, respectively, responsive to the actuator signal.

15. The method of claim 13, wherein the round baler comprises a tailgate movable between open and closed positions, the at least one position sensor is configured to sense the tailgate position, and wherein the open and closed positions correspond to the first and second positions, respectively.

16. The method of claim 13, wherein the round baler comprises a crop pick-up apparatus movable between raised and lowered positions, the at least one position sensor is configured to sense the pickup apparatus position, and wherein the open and closed positions correspond to the first and second positions, respectively.

17. The method of claim 13, wherein the round baler comprises a bale wrapping apparatus movable between a wrapping position and a standby position, the at least one position sensor is configured to sense the wrapping apparatus position, and wherein the open and closed positions correspond to the first and second positions, respectively.

18. The method of claim 13, further comprising the steps of:
providing an emergency stop switch on the baler having outputs corresponding to a stop state and an operating state;
initiating an emergency stop by actuating the emergency stop switch;
receiving by the second controller of the output corresponding to the stop state;
communicating via the communication bus between the second controller and the first controller in response to the emergency stop state; and
initiating by the first controller in response to communication with the second controller of an output signal configured to change the state of the power take-off and disengage the power take-off.

19. The method of claim 17 further comprising the steps of:
providing a memory module connected to said first controller or said second controller, the memory module configured to store a pre-selected value corresponding to a torque threshold;
providing a torque sensor disposed on the tractor, the torque sensor generating a running torque value;
inputting the pre-selected torque value into the memory module;
sensing by the torque sensor of the running torque of the power take-off;
comparing by the first controller the running torque value and the pre-selected value; and
initiating by the first controller an actuator signal to disengage the power take-off when the running torque value equals or exceeds said pre-selected torque value.

20. The method of claim 18, further comprising the steps of:
providing an operator interface having a display, the display configured to indicate the running torque value to a tractor operator; and
indicating by the display the running torque of the power take-off thereby enabling the tractor operator to adjust tractor speed to maximize running torque without exceeding pre-selected value thereby optimizing implement operating efficiency.

* * * * *